(12) United States Patent
Charny et al.

(10) Patent No.: US 7,986,618 B2
(45) Date of Patent: *Jul. 26, 2011

(54) DISTINGUISHING BETWEEN LINK AND NODE FAILURE TO FACILITATE FAST REROUTE

(75) Inventors: Anna Charny, Sudbury, MA (US); Robert Goguen, Acton, MA (US); Carol Iturralde, Framingham, MA (US); Elisheva Hochberg, Acton, MA (US); Jean Philippe Vasseur, Lompret (FR)

(73) Assignee: Cisco Technology, Inc., San Jose, CA (US)

( * ) Notice: Subject to any disclaimer, the term of this patent is extended or adjusted under 35 U.S.C. 154(b) by 1400 days.

This patent is subject to a terminal disclaimer.

(21) Appl. No.: 10/171,395

(22) Filed: Jun. 12, 2002

(65) Prior Publication Data

US 2003/0233595 A1  Dec. 18, 2003

(51) Int. Cl.
*G01R 31/08* (2006.01)
(52) U.S. Cl. .................................. 370/221; 370/225
(58) Field of Classification Search .................. None
See application file for complete search history.

(56) References Cited

U.S. PATENT DOCUMENTS

| | | | |
|---|---|---|---|
| 5,016,243 A * | 5/1991 | Fite, Jr. ........................... | 370/218 |
| 5,020,052 A | 5/1991 | Deprycker et al. .............. | 370/60 |
| 6,587,860 B1 * | 7/2003 | Chandra et al. ............... | 707/620 |
| 6,680,903 B1 * | 1/2004 | Moriguchi et al. ........... | 370/216 |
| 6,895,441 B1 * | 5/2005 | Shabtay et al. ............... | 709/238 |
| 6,904,018 B2 * | 6/2005 | Lee et al. ....................... | 370/238 |
| 7,046,929 B1 * | 5/2006 | Hester et al. .................... | 398/17 |
| 2001/0017866 A1 * | 8/2001 | Takada et al. .................. | 370/535 |
| 2002/0067693 A1 * | 6/2002 | Kodialam et al. ............. | 370/216 |
| 2002/0112072 A1 * | 8/2002 | Jain ............................... | 709/239 |
| 2002/0116669 A1 * | 8/2002 | Jain ................................. | 714/43 |
| 2003/0014516 A1 * | 1/2003 | Blackmore et al. ........... | 709/224 |
| 2003/0055954 A1 * | 3/2003 | Kavanagh ..................... | 709/224 |
| 2003/0133417 A1 * | 7/2003 | Badt, Jr. ........................ | 370/254 |
| 2003/0169692 A1 * | 9/2003 | Stern et al. .................... | 370/242 |
| 2003/0210705 A1 * | 11/2003 | Seddigh et al. ............... | 370/419 |
| 2008/0002669 A1 * | 1/2008 | O'Brien et al. ............... | 370/352 |

FOREIGN PATENT DOCUMENTS

DE    10052312    11/2001

OTHER PUBLICATIONS

R. Pan, et al. "Fast Reroute Extensions to RSVP-TE for LSP Tunnels," Internet Draft, Jul. 2002, draft-ietf-mpls-rsvp-lsp-fastreroute-00.txt, pp. 1-33.

V. Sharma, et al. "Framework for MPLS-based Recovery," Internet Draft, Aug. 2001, <draft-ietf-mpls-recovery-frmwrk-02.txt>, pp. 1-33.

(Continued)

*Primary Examiner* — Seema S Rao
*Assistant Examiner* — Rhonda Murphy
(74) *Attorney, Agent, or Firm* — Cindy Kaplan

(57) ABSTRACT

Systems and methods for distinguishing a node failure from a link failure are provided. By strengthening the assumption of independent failures, bandwidth sharing among backup tunnels protecting links and nodes of a network is facilitated as well as distributed computation of backup tunnel placement. Thus a backup tunnel overlay network can provide guaranteed bandwidth in the event of a failure.

28 Claims, 3 Drawing Sheets

OTHER PUBLICATIONS

K. Owens, et al. "A Path Protection/Restoration Mechanism for MPLS Networks," Internet Draft, Nov. 2000, <draft-chang-mpls-pathprotection-02.txt>, pp. 1-24.

C. Huang, et al. "Building Reliable MPLS Networks Using a Path Protection Mechanism," IEEE Communications Magazine, Mar. 2002, pp. 156-162.

R. Braden, et al. "Resource ReSerVation Protocol (RSVP)—Version 1 Functional Specification," RFC 2205, Internet Engineering Task Force, Sep. 1997.

D. Awduche, et al. "Requirements for Traffic Engineering Over MPLS," RFC 2702, Internet Engineering Task Force, Sep. 1999.

E. Rosen, et al. "Multiprotocol Label Switching Architecture," RFC 3031, Internet Engineering Task Force, Jan. 2001.

D. Gan, et al. "A Method for MPLS LSP Fast-Reroute Using RSVP Detours," Internet Draft, Internet Engineering Task Force, Apr. 2001.

J. P. Lang, et al. Generalized MPLS Recovery Mechanisms, Internet Draft, Internet Engineering Task Force, Jun. 2001.

P. Ashwood-Smith, et al. Generalized MPLS Signaling—RSVP-TE Extensions, Internet Draft, Internet Engineering Task Force, Oct. 2001.

Pan, et al. "Fast Reroute Techniques in RSVP-TE," Internet Draft, Internet Engineering Task Force, Nov. 2001.

F. LeFaucheur, et al. "Requirements for Support of Diff-Serv-aware MPLS Traffic Engineering," Internet Draft, Internet Engineering Task Force, Nov. 2001.

Charny et al., U.S. Appl. No. 10/080,953, filed Feb. 22, 2002, "Linear Program-Based Technique for Placing FRR Te Tunnels With Bandwidth Guarantee".

Charny et al., U.S. Appl. No. 10/038,259, filed Jan. 2, 2002, "Implicit Shared Bandwidth Protection for Fast Reroute".

Charny et al., U.S. Appl. No. 10/052,665, filed Jan. 17, 2002, "Load Balancing for Fast Reroute Backup Tunnels".

Vasseur et al., U.S. Appl. No. 10/166,886, filed Jun. 11, 2002, "MPLS Fast Reroute Without Full Mesh Traffic Engineering".

* cited by examiner

DISTINGUISHING BETWEEN LINK AND NODE FAILURE TO FACILITATE FAST REROUTE

STATEMENT OF RELATED APPLICATION

The present application is related to the subject matter of the following pending applications:

U.S. application Ser. No. 10/080,956 entitled "LINEAR PROGRAM-BASED TECHNIQUE FOR PLACING FRR TE TUNNELS WITH BANDWIDTH GUARANTEE", filed on Feb. 22, 2002;

U.S. application Ser. No. 10/038,259 entitled "IMPLICIT SHARED BANDWIDTH PROTECTION FOR FAST REROUTE", filed on Jan. 2, 2002;

U.S. application Ser. No. 10/052,665 entitled "LOAD BALANCING FOR FAST REROUTE BACKUP TUNNELS", filed on Jan. 17, 2002;

U.S. application Ser. No. 10/166,886 entitled "MPLS FAST REROUTE WITHOUT FULL MESH TRAFFIC ENGINEERING", filed on Jun. 11, 2002.

The contents of the above-identified application are herein incorporated by reference for all purposes in their entirety.

BACKGROUND OF THE INVENTION

The present application relates to data networking and more particularly to systems and methods for rerouting around failed links and/or nodes.

The Internet and IP networks in general have become key enablers to a broad range of business, government, and personal activities. More and more, the Internet being relied upon as a general information appliance, business communication tool, entertainment source, and as a substitute for traditional telephone networks and broadcast media. As the Internet expands its role, users become more and more dependent on uninterrupted access.

To assure rapid recovery in the event of failure of a network link or node, so-called "Fast Reroute" techniques have been developed. In a network employing Fast Reroute, traffic flowing through a failed link or node is rerouted through one or more preconfigured backup tunnels. Redirection of the impacted traffic occurs very quickly to minimize impact on the user experience, typically in tens of milliseconds.

These Fast Reroute techniques have been developed in the context of MPLS Traffic Engineering where traffic flows through label switched paths (LSPs). Typically, the overall network is configured such that traffic flows through guaranteed bandwidth end-to-end "primary" LSPs. It is also possible to establish short primary LSPs in a non-Traffic Engineering network, only for the purpose of taking advantage of Fast Reroute techniques (see above-referenced patent application entitled "MPLS Reroute Without Full Mesh Traffic Engineering.")

In either case, when a link or node failure occurs, traffic affected by the failure is rerouted to the preconfigured backup tunnels. These backup tunnels are used only for a very short time since simultaneously with the rerouting through the backup tunnels, the head ends of all affected primary LSPs are notified of the failure. This causes the head ends to reroute the primary LSPs around the failures so that the backup tunnels are no longer needed. It is generally assumed that the probability of multiple failures in such a short time is small, so each failure may be considered independently.

Under the independent failure assumption, link bandwidth available for backup tunnels may be shared between backup tunnels protecting different links or nodes. The techniques disclosed in U.S. patent application Ser. No. 10/038,259 make use of this assumption to allow available backup bandwidth to be shared among links or nodes to be protected while assuring that guaranteed bandwidth requirements continue to be met during Fast Reroute conditions. On the other hand, without taking advantage of the independent failure assumption, it is very difficult to assure guaranteed bandwidth during failure recovery while using bandwidth resources efficiently.

Mechanisms currently available for failure detection do not always allow the failure of a link to be distinguished from failure of a node. For example, a network node may lose communication via a particular link without knowing whether only the link itself has failed or the node to which the link has connected has failed. This ambiguity can cause the network to attempt to reroute around simultaneous failures when in fact only a single failure has occurred. The combined backup bandwidth requirements of simultaneous failures may exceed available backup bandwidth on some links leading to a violation of bandwidth guarantees and possible user perception of deteriorated service.

In theory it would be possible to correct this ambiguity by centrally determining backup tunnels such that no such clash is possible. However, placing this constraint on backup tunnel placement leads to less efficient use of available bandwidth. Furthermore, computing the correct placement of backup tunnels would also become far more complex and computation-intensive.

Furthermore, it is more desirable to compute backup tunnels in a distributed fashion rather than centrally. If backup tunnel computation is to be done in a distributed fashion across the network, the task is made practically impossible due to the need to signal a large amount of backup tunnel information among nodes. If link failures could be distinguished from node failures, the validity of the independent failure assumption would be strengthened, allowing backup tunnels to be computed in a distributed fashion and readily signaled with zero bandwidth in accordance with the techniques disclosed in U.S. patent application Ser. No. 10/038,259 without compromise to bandwidth guarantees.

What is needed are systems and methods for determining whether a link or a neighboring node to which the link connects has failed.

SUMMARY OF THE INVENTION

Systems and methods for distinguishing a node failure from a link failure are provided by virtue of one embodiment of the present invention. By strengthening the assumption of independent failures, bandwidth sharing among backup tunnels protecting links and nodes of a network is facilitated as well as distributed computation of backup tunnel placement. Thus a backup tunnel overlay network can provide guaranteed bandwidth in the event of a failure.

One aspect of the present invention provides a method of operating a selected node to distinguish between failure of a link connected to the selected node and failure of a neighboring node connected to the selected node through the link. The method includes: pre-configuring an alternate path from the selected node to the neighboring node, the alternate path not including the link, and upon detection of a failure of communication via the link, using the alternate path to verify operation of the neighboring node.

Further understanding of the nature and advantages of the inventions herein may be realized by reference to the remaining portions of the specification and the attached drawings.

DESCRIPTION OF SPECIFIC EMBODIMENTS

Figure 2:
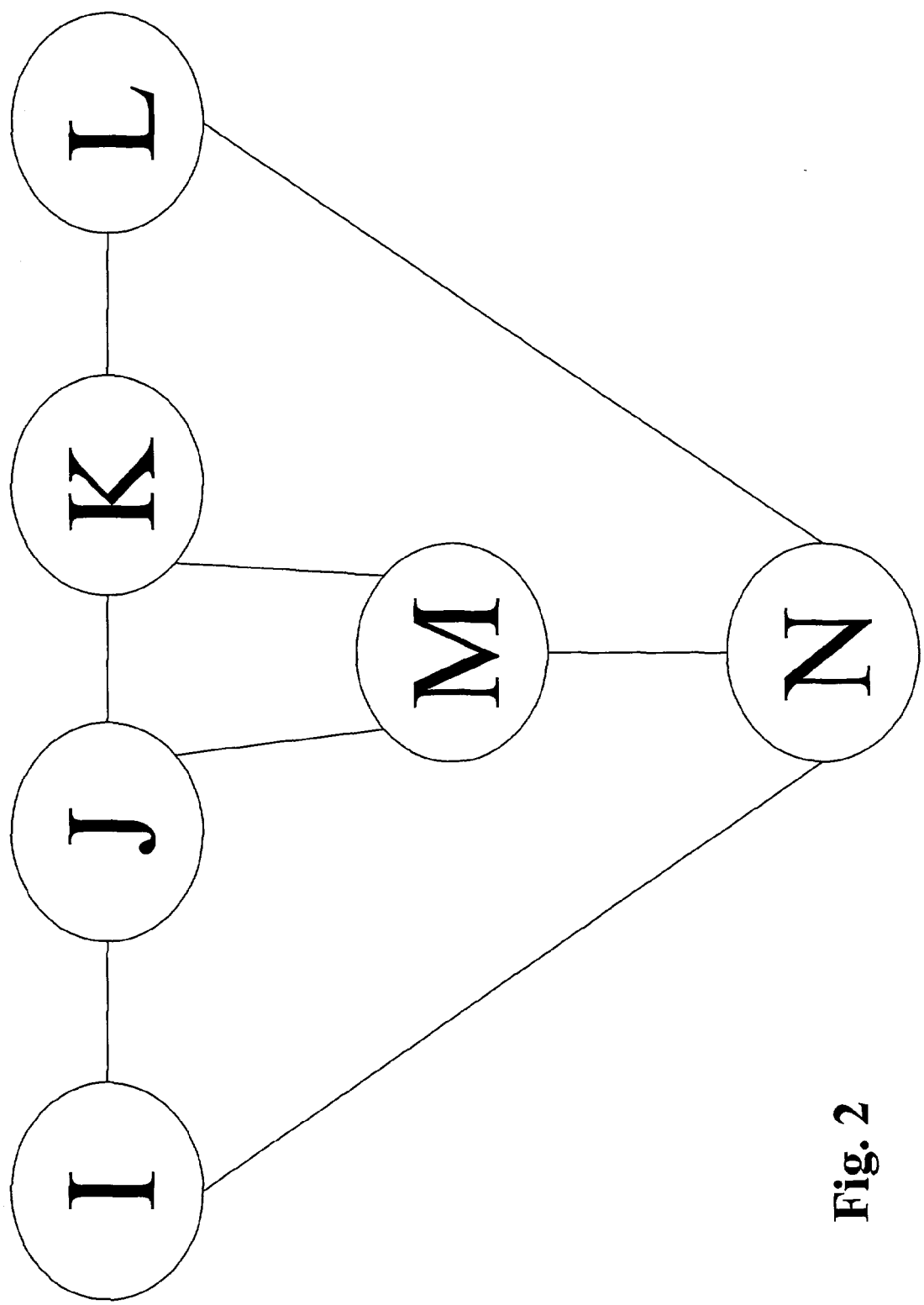
FIG. 2 depicts a network configuration useful in illustrating embodiments of the present invention.

The present invention will be described with reference to a representative network environment that uses a particular representative combination of protocols to move data through the network. FIG. 2 depicts a particular configuration of network nodes in such an environment. The network nodes are interconnected by links may be implemented using any type of physical medium such as e.g., an optical medium, a wireless medium, twisted pair, etc.

In one embodiment, the nodes of FIG. 2 interoperate in a manner specified by various protocols including, e.g., TCP/IP as known in the art, suitable link layer protocols such as Link Management Protocol (LMP), and protocols defined by the following documents:

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS" RFC 2702, Internet Engineering Task Force, September 1999.

Ashwood-Smith, et al., "Generalized MPLS Signaling—RSVP-TE Extensions," Internet Draft, Internet Engineering Task Force, October 2001.

Pan, et al., "Fast Reroute Techniques in RSVP-TE," Internet Draft, Internet Engineering Task Force, October 2001.

The contents of the above documents are herein incorporated by reference in their entirety for all purposes.

In one embodiment, the nodes of FIG. 2 are IP routers that implement multiprotocol label switching (MPLS) and essentially operate as label switched routers (LSRs). The nodes of FIG. 2 may also implement MPLS Traffic Engineering (MPLS TE) and/or Diffserv-Aware Traffic Engineering. Traffic flows through end-to-end LSPs that are configured to offer guaranteed bandwidth, latency, jitter, etc. This type of environment is, however, merely representative. Embodiments of the present invention are applicable regardless of the properties of traffic carried across the network.

When a given LSP in a network employing MPLS TE experiences a node or link failure, the head-end, i.e., the ingress, will establish a new LSP as a substitute. However, this process requires far longer than desirable. Accordingly, a local fast reroute capability is provided so that when a node or a link fails, an LSP is temporarily rerouted around the failed link or node while a new end-to-end LSP is being established at the head-end.

Each link (a bidirectional link is considered as two links with identical endpoints) is protected by one or more backup tunnels that do not include the protected link. A backup tunnel or tunnels may also collectively protect a shared risk link group (SRLG), i.e., a group of links that are expected to experience simultaneous failure because, e.g., they share a common fiber. Each node is protected by one or more backup tunnels that do not include the protected node.

To assure that bandwidth guarantees continue to be met during fast reroute conditions, backup tunnels are preferably configured with sufficient bandwidth to support all primary traffic through the protected link, SRLG, or node. This is impractical unless one assumes that failures will not be simultaneous and that therefore bandwidth available for backup tunnels may be shared among protected elements. With this assumption, however, backup bandwidth may be guaranteed provided that the backup tunnels protecting any one element do not consume more backup bandwidth than is available. Further details of configuring and placing backup tunnels are disclosed in U.S. application Ser. Nos. 10/080,956, 10/038,259, and 10/052,665.

A failure of a neighboring node may be detected by the absence of expected RSVP Hello messages. A failure of a link may be detected by, e.g., alarm conditions reported from the physical and/or link layers. When a node fails, it may or may not bring down the links to which it is connected. If a link has failed, a node to which the link connects will detect the link failure but may not realize that the neighboring node at the other end of the failed link may have failed.

To maintain the independent failure assumption, it is desirable that when a link or SRLG fails, traffic is rerouted through the backup tunnel(s) that protect the link or SRLG, and a node fails, traffic is rerouted through the backup tunnel(s) that protect the node. However, to do so, it is necessary to accurately distinguish between link failure and node failure. However, no known prior art mechanism allows distinguishing between different kinds of failures under all circumstances. In particular, if a link failure is detected, it is currently impossible, in most cases, to decide whether it is just this link that failed, or whether the node on the other side of the link failed and caused the failure of its adjacent links as well. As a result, the current equipment simultaneously invokes backup tunnels that are established to protect the link and backup tunnels that are computed to protect the node. If bandwidth guarantees are desired in the presence of failure, then such simultaneous invocation may result in the loss of bandwidth guarantees.

Another example of a similar phenomenon will be described with reference to FIG. 2. Assume that traffic flowing from node K through node J to node I has a total bandwidth requirement of 1 Mbps. Assume that the link from node M to node N has only 1 Mbps of available backup bandwidth, and that all other links have 10 Mbps bandwidth available for protection. Under the assumption that nodes J and K will not fail simultaneously, this traffic can be protected against failure of node J by establishing a backup tunnel including nodes K, M, N, and I (because the path K-M-N-I has enough bandwidth to accommodate 1 Mbps of traffic flowing from K to J to I). Assume that traffic flowing from node J through node K to node L also has a total bandwidth requirement of 1 Mbps. This traffic may be protected against failure of node K by establishment of a backup tunnel including nodes J, M, N, and L, because path J, M, N, L has enough bandwidth to accommodate 1 Mbps of traffic flowing from J to K to L. Both nodes J and K can be protected by two different backup tunnels each separately requiring 1 Mbps bandwidth on link MN, which has only 1 Mbps available bandwidth, because the placement of these tunnels assumes that only one of nodes J and K can fail at a time.

However, the inability to reliably distinguish node failures from link failures can cause the backup bandwidth to be exceeded. Consider the case where the link between nodes J and K suffers a bidirectional failure but nodes J and K remain operational. Upon detection of the link failure, node J may behave as if node K has failed and invoke the above-described backup tunnel protecting node K. Similarly, node K may detect link failure of the other link direction and behave as if node J has failed, invoking the other backup tunnel described above. Now, both backup tunnels sharing the link from node M to node N are needed and exceed the available backup bandwidth since the independent failure assumption has been implicitly violated even though neither node has actually failed.

Figure 3:
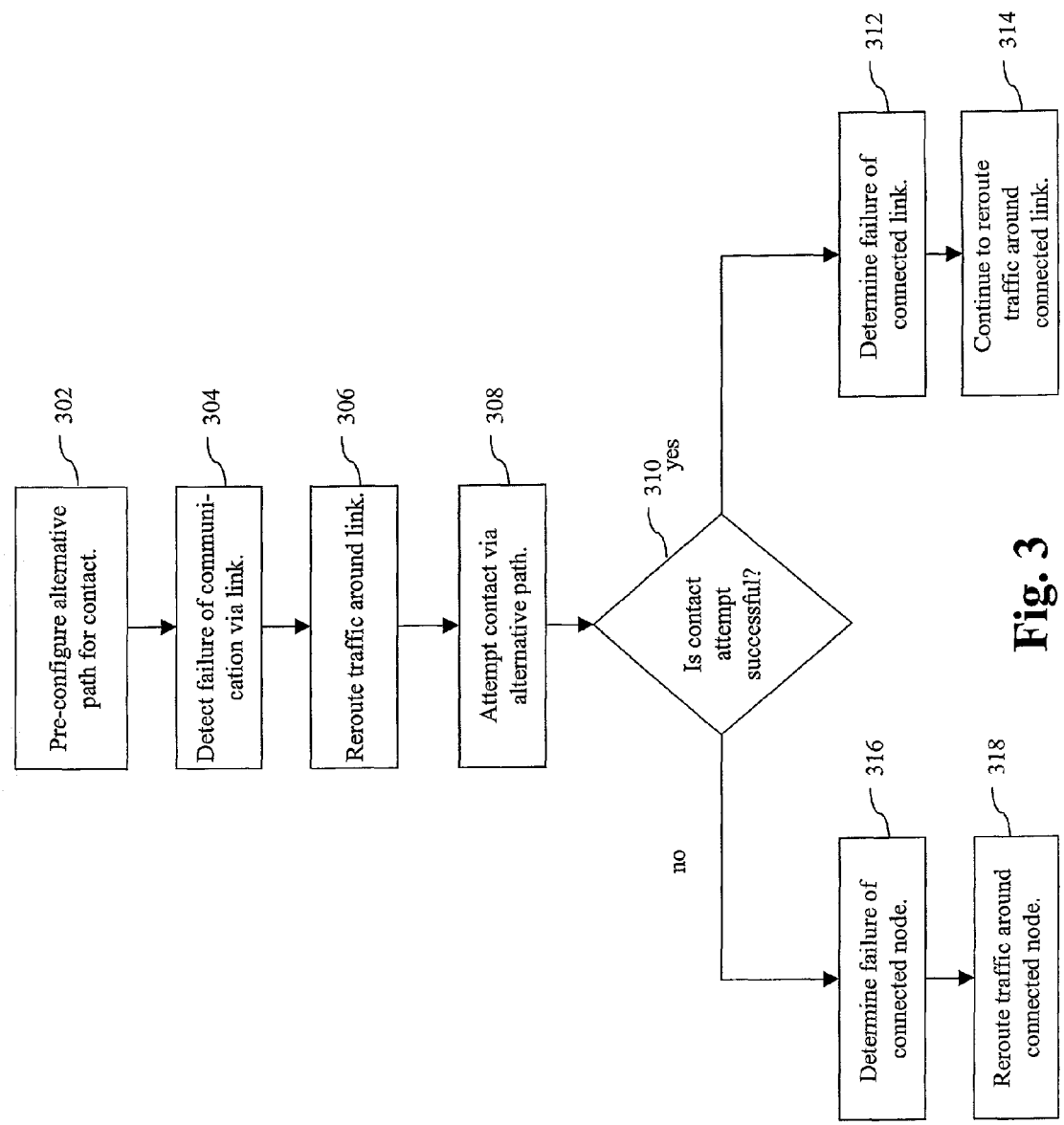
FIG. 3 is a flowchart describing steps of distinguishing a link failure from a node failure according to one embodiment of the present invention.

According to one embodiment of the present invention, scenarios like those described with reference to FIG. 2 may be avoided by accurately distinguishing between link and node failure at the time of failure and then patching in backup tunnels pre-configured for the failed element. FIG. 3 is a flowchart describing steps of distinguishing between link and node failure and reacting appropriately according to one embodiment of the present invention.

The mechanism described with reference to FIG. 3 provides at each interface for an alternate path for a node to attempt contact with its neighbor once communication through a direct link has been lost. At step 302, this path is preconfigured. Step 302 may be performed as part of the same process that generally establishes backup tunnels and may be performed centrally or in a distributed fashion. For each bidirectional link, two such contact paths are established between the nodes neighboring the link, one for each direction.

The contact paths should preferably not include the direct link, any link in the same SRLG, or any link parallel to this direct link because in case of neighboring node failure, all such parallel links may fail simultaneously, and the alternate contact path would not be available. The contact paths may be backup tunnels such as the ones used to protect nodes and links but requiring only minimal bandwidth. One backup tunnel may provide an alternative contact path for multiple links. It is preferable to establish the contact paths with minimum path length to minimize propagation time. If information is available as to membership in SRLGs, the contact paths should avoid all links in the same SRLG. In one embodiment, the backup tunnels protecting a link are also used to provide the contact path for failure detection purposes.

A step 304 occurs during network operation. At step 304, a node detects loss of communication via an adjoining link. This detection of failure may arise due to a link layer or physical layer alarm message or due to a loss of the RSVP Hello exchange that is expected along an MPLS TE LSP. In the absence of further information as to whether the link itself has failed or a neighboring node reached though the link has failed, traffic is redirected into the backup tunnel(s) protecting the link at step 306. This is done to minimize restoration time if the failure is indeed a link failure. Then at step 308, the node attempts contact with its neighbor via the alternate path established for this purpose. The contact may be in the form of an RSVP Hello message to which a response is expected. A step 310 tests whether contact is successful. If contact was successful, a step 312 determines that the node is operational and that the link has failed. Then at step 314, traffic bound for the neighboring node continues to be rerouted through the backup tunnel(s) protecting the failed link.

If contact was unsuccessful, step 316 determines that the neighboring node has failed. The traffic that had previously been shifted to the backup tunnel(s) protecting the link is now shifted to the backup tunnel(s) protecting the neighboring node at step 318.

Step 316 may also be reached if there is an indication (e.g., receipt of a Path Error or RSVP Notify message, etc.) that the backup tunnel protecting the failed link has also failed. In this case, the contact attempt is interrupted and step 310 can be skipped since a neighboring node failure can be concluded based on the backup tunnel failure.

In an alternative embodiment, the RSVP Hello messages are sent periodically through the alternate path even when no failure has been detected. In this case, step 310 can operate by checking the status of the ongoing exchange. In situations where propagation delay along the alternate contact path is significant, this can accelerate the determination of whether a node failure or a link failure has occurred. This routine RSVP Hello message exchange via the alternate path may supplement or substitute for RSVP Hello exchange in reaction to a detected failure. Where the link failure detection mechanism is expected to react quickly and the propagation delay over the alternate path is small, it may be preferably to initiate the RSVP Hello exchange via the alternate contact path only in the event of a detected failure. By contrast, if the propagation delay is large, it may be preferable to rely on routine exchange of RSVP Hellos.

It will be seen that by accurately distinguishing between link and node failure, embodiments of the present invention strengthen the assumption that Fast Reroute need only respond to a single failure at a time. Thus guaranteed bandwidth may readily be provided continuously under failure conditions, even where it is necessary to accurately distinguish between link and node failures.

Network Device Details

Figure 1:
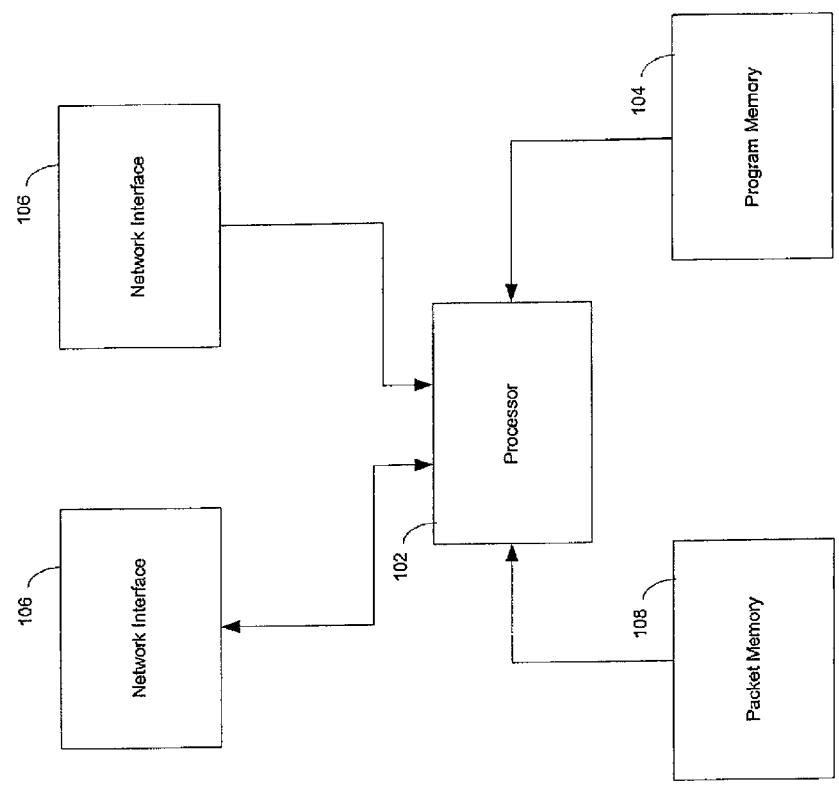
FIG. 1 depicts a network device according to one embodiment of the present invention.

FIG. 1 depicts a network device 100 that may be used to implement any of the described nodes or a network management workstation. In one embodiment, network device 100 is a programmable machine that may be implemented in hardware, software or any combination thereof. A processor 102 executes code stored in a program memory 104. Program memory 104 is one example of a computer-readable storage medium. Program memory 104 can be a volatile memory. Another form of computer-readable storage medium storing the same codes would be some type of non-volatile storage such as floppy disks, CD-ROMs, DVD-ROMs, hard disks, flash memory, etc. A carrier wave that carries the code across a network is an example of a transmission medium.

Network device 100 interfaces with physical media via a plurality of network interfaces 106. For example, one of network interfaces 106 may couple to an optical fiber and may incorporate appropriate physical and link layer functionality. Other examples of network interfaces include Ethernet interfaces, DSL interfaces, Gigabit Ethernet interfaces, 10-Gigabit Ethernet interfaces, etc. As packets are received, processed, and forwarded by network device 100, they may be stored in a packet memory 108. Network device 100 implements all of the network protocols and extensions thereof described above as well as the data networking features provided by the present invention.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method of operating a selected node to distinguish between failure of a link connected to said selected node and failure of a neighboring node connected to said selected node through said link, said method comprising:
 pre-configuring an alternate path from said selected node to said neighboring node, said alternate path not including said link;
 upon detection of a failure of communication from said neighboring node via said link, using said alternate path to verify operation of said neighboring node and determine whether said neighboring node or said link has failed; and rerouting traffic based on whether said neighboring node or said link has failed;
wherein determining whether said neighboring node or said link has failed and rerouting traffic comprises:
transmitting a message to said neighboring node on said alternate path;
if a response to said message is not received, determining that said neighboring node has failed and rerouting traffic around said neighboring node and into a backup tunnel configured to protect said neighboring node; and
if a response to said message is received, determining that said link has failed and rerouting traffic around said link and into a backup tunnel configured to protect said link, said alternate path comprising said backup tunnel configured to protect said link;
wherein said backup tunnel configured to protect said neighboring node comprises bandwidth to cover failure of said neighboring node and said backup tunnel configured to protect said link comprises bandwidth to cover failure of said link and wherein at least one of said backup tunnels does not comprise bandwidth to cover failure of said neighboring node and said link.

2. The method of claim 1 wherein said backup tunnel comprises an MPLS Traffic Engineering backup tunnel.

3. The method of claim 1 wherein transmitting a message comprises:
conducting an RSVP Hello exchange.

4. The method of claim 1 wherein said alternate path does not include another link parallel to said link.

5. The method of claim 1 wherein said selected node and said neighboring node are label switched routers.

6. The method of claim 1 wherein said backup tunnel protects a shared risk link group.

7. The method of claim 1 wherein said backup tunnel comprises at least two backup tunnels.

8. The method of claim 1 wherein detection of a failure of communication comprises detection of an alarm condition indicating loss of communication from said neighboring node.

9. The method of claim 1 wherein at least one of said backup tunnels is configured to share bandwidth with one or more other backup tunnels protecting independent failures.

10. The method of claim 1 wherein said backup tunnels comprise label switched paths.

11. The method of claim 1 wherein rerouting traffic comprises utilizing fast reroute.

12. A non-transitory computer readable storage medium encoded with a computer program for operating a selected node to distinguish between failure of a link connected to said selected node and failure of a neighboring node connected to said selected node through said link, said computer program comprising:
code that pre-configures an alternate path from said selected node to said neighboring node, said alternate path not including said link;
code that, upon detection of a failure of communication from said neighboring node via said link, uses said alternate path to verify operation of said neighboring node and determine whether said neighboring node or said link has failed; and
code that reroutes traffic based on whether said neighboring node or said link has failed;
wherein code that determines whether said neighboring node or said link has failed and reroutes traffic comprises:
code that transmits a message to said neighboring node on said alternate path;
code that determines that said neighboring node has failed and reroutes traffic around said neighboring node and into a backup tunnel configured to protect said neighboring node, if a response to said message is not received; and
code that determines that said link has failed and reroutes traffic around said link and into a backup tunnel configured to protect said link, if a response to said message is received, said alternate path comprising said backup tunnel configured to protect said link;
wherein said backup tunnel configured to protect said neighboring node comprises bandwidth to cover failure of said neighboring node and said backup tunnel configured to protect said link comprises bandwidth to cover failure of said link and wherein at least one of said backup tunnels does not comprise bandwidth to cover failure of said neighboring node and said link.

13. The non-transitory computer readable storage medium of claim 12 wherein said backup tunnel comprises an MPLS Traffic Engineering backup tunnel.

14. The non-transitory computer readable storage medium of claim 12 wherein said code that transmits a message comprises:
code that conducts an RSVP Hello exchange.

15. A network device for operating a selected node to distinguish between failure of a link connected to said selected node and failure of a neighboring node connected to said selected node through said link, said network device comprising:
a processor;
a memory, said memory storing instructions for execution on said processor, said instructions comprising:
code that pre-configures an alternate path from said selected node to said neighboring node, said alternate path not including said link;
code that, upon detection of a failure of communication from said neighboring node via said link, uses said alternate path to verify operation of said neighboring node and determine whether said neighboring node or said link has failed; and
code that reroutes traffic based on whether said neighboring node or said link has failed;
wherein code that determines whether said neighboring node or said link has failed and reroutes traffic comprises:
code that transmits a message to said neighboring node on said alternate path;
code that determines that said neighboring node has failed and reroutes traffic around said neighboring node and into a backup tunnel configured to protect said neighboring node, if a response to said message is not received; and
code that determines that said link has failed and reroutes traffic around said link and into a backup tunnel configured to protect said link, if a response to said message is received, said alternate path comprising said backup tunnel configured to protect said link;
wherein said backup tunnel configured to protect said neighboring node comprises bandwidth to cover failure of said neighboring node and said backup tunnel configured to protect said link comprises bandwidth to cover failure of said link and wherein at least one of said backup tunnels does not comprise bandwidth to cover failure of said neighboring node and said link.

16. The network device of claim 15 wherein said backup tunnel comprises an MPLS Traffic Engineering backup tunnel.

17. The network device of claim 15 wherein said code that transmits a message comprises:
   code that conducts an RSVP Hello exchange.

18. The network device of claim 15 wherein said alternate path does not include another link parallel to said link.

19. The network device of claim 15 wherein said backup tunnel protects a shared risk link group.

20. The network device of claim 15 wherein said backup tunnel comprises at least two backup tunnels.

21. The network device of claim 15 wherein detection of a failure of communication comprises detection of an alarm condition indicating loss of communication from said neighboring node.

22. A network device comprising a router operable to distinguish between failure of a link connected to the router and failure of a neighboring node connected to the router through said link, said network device comprising:
   a processor for pre-configuring an alternate path from the router to said neighboring node, said alternate path not including said link, detecting a failure of communication from said neighboring node via said link, transmitting a message to said neighboring node on said alternate path, determining that said neighboring node has failed and rerouting traffic around said neighboring node and into a backup tunnel configured to protect said neighboring node if a response to said message is not received, determining that said link has failed and rerouting traffic around said link and into a backup tunnel configured to protect said link if a response to said message is received, said alternate path comprising said backup tunnel configured to protect said link; and
   memory for storing bandwidth requirements and routing information for said alternate path and said backup tunnel;
   wherein said backup tunnel configured to protect said neighboring node comprises bandwidth to cover failure of said neighboring node and said backup tunnel configured to protect said link comprises bandwidth to cover failure of said link and wherein at least one of said backup tunnels does not comprise bandwidth to cover failure of said neighboring node and said link.

23. The network device of claim 22 wherein said backup tunnel configured to protect said link includes said neighboring node and said backup tunnel configured to protect said neighboring node does not include said neighboring node.

24. The network device of claim 22 wherein said message comprises an RSVP Hello message.

25. The network device of claim 22 wherein the router and the neighboring node comprise IP routers configured to implement MPLS.

26. The network device of claim 22 wherein the network device is configured for fast reroute.

27. The network device of claim 22 wherein said message is transmitted periodically on said alternate path when no failure has been detected.

28. The network device of claim 22 wherein at least one of said backup tunnels is configured to share bandwidth with one or more other backup tunnels protecting independent failures.

* * * * *